(12) United States Patent
Sutherland et al.

(10) Patent No.: US 9,923,370 B2
(45) Date of Patent: *Mar. 20, 2018

(54) HYBRID WINCH WITH CONTROLLED RELEASE AND TORQUE IMPULSE GENERATION CONTROL FOR ANCHOR HANDLING OFFSHORE

(71) Applicant: Electronic Power Design, Inc., Houston, TX (US)

(72) Inventors: Charles Sutherland, Houston, TX (US); John Bradford Janik, Houston, TX (US)

(73) Assignee: Electronic Power Design, Inc.

( * ) Notice: Subject to any disclaimer, the term of this patent is extended or adjusted under 35 U.S.C. 154(b) by 0 days.

This patent is subject to a terminal disclaimer.

(21) Appl. No.: 15/209,387

(22) Filed: Jul. 13, 2016

(65) Prior Publication Data

US 2017/0012427 A1 Jan. 12, 2017

Related U.S. Application Data

(63) Continuation of application No. 13/555,120, filed on Jul. 21, 2012, now Pat. No. 9,401,605.

(51) Int. Cl.
*H02J 3/01* (2006.01)
*H02J 3/18* (2006.01)
*H02J 4/00* (2006.01)

(52) U.S. Cl.
CPC ............... *H02J 3/01* (2013.01); *H02J 3/185* (2013.01); *H02J 3/1842* (2013.01); *H02J 4/00* (2013.01); *Y02E 40/22* (2013.01); *Y02E 40/24* (2013.01)

(58) Field of Classification Search
CPC .. H02J 3/01; H02J 3/1842; H02J 3/185; H02J 4/00; Y02E 40/22; Y02E 40/24
See application file for complete search history.

(56) References Cited

U.S. PATENT DOCUMENTS

| | | | | |
|---|---|---|---|---|
| 5,731,965 A | * | 3/1998 | Cheng ................. | H02J 3/01 307/105 |
| 7,692,415 B2 | * | 4/2010 | Yasuda ................ | G05F 1/70 307/105 |
| 2002/0105816 A1 | * | 8/2002 | Boudrias ............. | H02J 3/01 363/39 |
| 2010/0187914 A1 | * | 7/2010 | Rada ................... | G05F 1/70 307/105 |

\* cited by examiner

*Primary Examiner* — Jared Fureman
*Assistant Examiner* — Joel Barnett
(74) *Attorney, Agent, or Firm* — G. Michael Roebuck, PC

(57) ABSTRACT

A computer program product and system are disclosed including but not limited to supplying a voltage waveform from a higher power electrical bus to a lower power electrical bus; sensing on the lower power electrical bus, a deviation from a sinusoidal voltage waveform in the voltage waveform supplied from the higher power electrical bus; generating a correction current to adjust the deviation in the voltage on the lower power bus to a substantially sinusoidal voltage waveform; and filtering the correction current to substantially attenuate the correction current from propagating through the filter from the lower power electrical bus to the higher power electrical bus.

8 Claims, 4 Drawing Sheets

US 9,923,370 B2

HYBRID WINCH WITH CONTROLLED RELEASE AND TORQUE IMPULSE GENERATION CONTROL FOR ANCHOR HANDLING OFFSHORE

CROSS REFERENCE TO RELATED APPLICATIONS

The patent application claims priority from U.S. Provisional Patent Application Ser. No. 61/510,347 entitled "A System and Method for Reducing Harmonic Distortion" by John Bradford Janik filed on Jul. 21, 2011, and from from U.S. patent application Ser. No. 13/555,120 entitled "A System and Method for Reducing Harmonic Distortion" by John Bradford Janik and Charles Sutherland filed on Jul. 21, 2012 which are all hereby incorporated by reference in its entirety.

BACKGROUND OF THE DISCLOSURE

Numerous applications provide high voltage power distribution busses which power electrical and electronic devices connected to the power distribution bus. Often times, electrical equipment acting as a load on the high voltage power distribution bus introduce noise onto the high voltage power distribution bus. In some cases, harmonic distortion currents are generated by the load on the high voltage power distribution bus. The harmonic distortion currents are problematic when they occur in an electrical circuit. In many of the these high voltage distribution buses, step down electrical power transformers are provided to step down the higher voltage on the higher voltage power distribution bus to a lower voltage supplied to a lower voltage power distribution bus. Unfortunately the harmonic currents generate noise on the voltage supplied from the high power voltage distribution bus, which are passed through the step down to the lower voltage power distribution bus. In some cases, the noisy voltage passed down to the lower voltage is in appropriate for electrical components existing as a load on the lower voltage power distribution bus. Thus, there is a need for a system and method for monitoring, filtering and cleaning up an electrical system into which harmonic distortion currents are injected.

FIELD OF THE DISCLOSURE

The present disclosure describes a system and method for reducing harmonic distortion in an electrical circuit.

SUMMARY OF THE DISCLOSURE

A method is disclosed including but not limited to supplying a voltage waveform from a higher power electrical bus to a lower power electrical bus; sensing on the lower power electrical bus, a deviation from a sinusoidal voltage waveform in the voltage waveform supplied from the higher power electrical bus; generating a correction current to adjust the deviation in the voltage on the lower power bus to a substantially sinusoidal voltage waveform; and filtering the correction current to substantially attenuate the correction current from propagating through the filter from the lower power electrical bus to the higher power electrical bus. A system is disclosed for performing the method.

DETAILED DESCRIPTION

Figure 1:
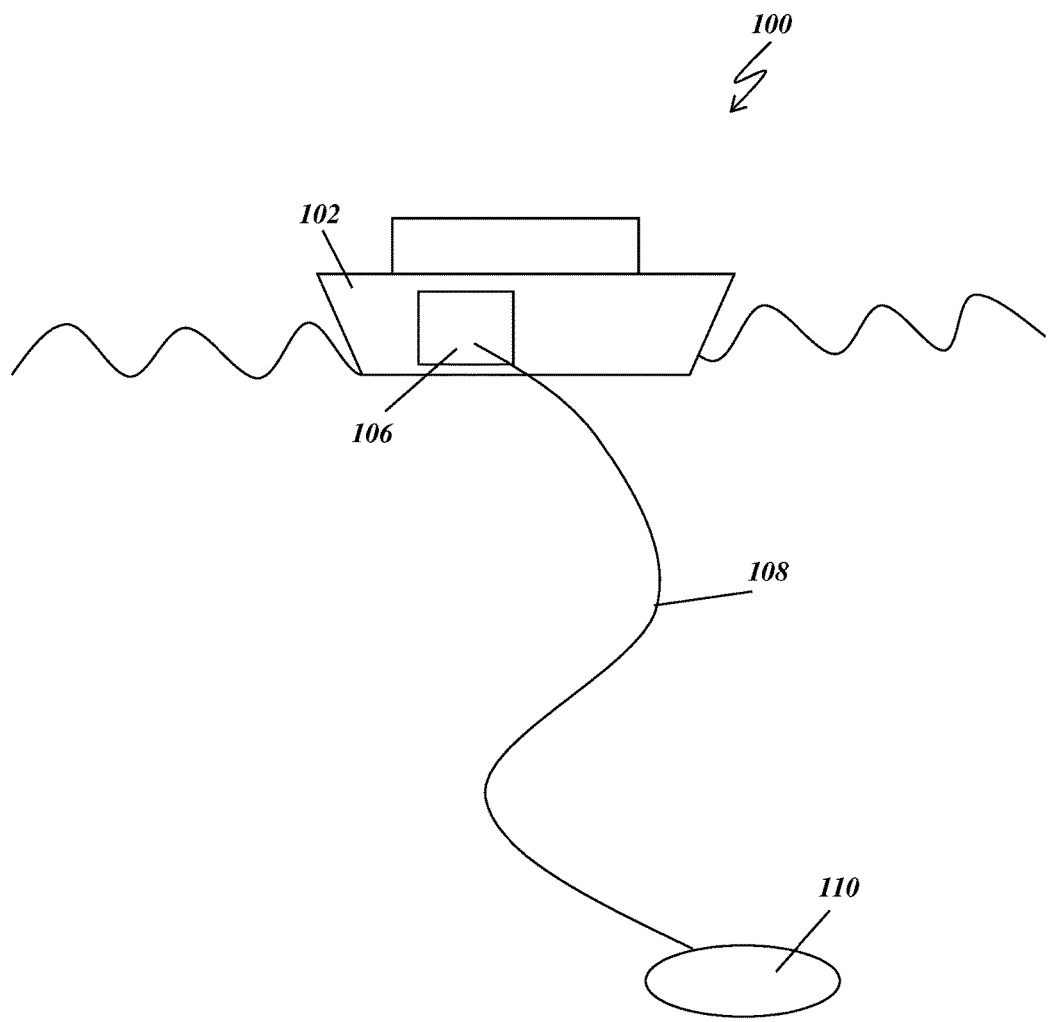
FIG. 1 depicts an operational environment for a particular illustrative embodiment wherein an ocean going vessel is providing electrical power to a tethered submarine.

Harmonic distortion from loads in an electrical system cause variations in the power supplied to the electrical system. Thus, power variations that occur in a high power bus in the electrical system are transferred to lower power buses that receive power from the higher power electrical bus. In the past, many of these harmonic distortion problems that occurred in electrical power applications have been addressed by globally by sensing harmonic distortion currents on the higher power electrical bus generated by a main load on the higher power bus in the electrical system. Thus, in the past, some electrical engineers globally solved local harmonic noise voltage problems with a global solution applied to the higher power electrical bus to solve a local harmonic distortion power supply problems the were transferred to lower power bus. In the past global approach, a current transformer was placed on the higher power electrical bus near a main load which generated harmonic distortion currents on the main high power electrical bus.

In the global approach, the current transformer was connected in reverse polarity to the main high power electrical bus near the main load on the higher power electrical bus. Thus, the polarity of the harmonic currents generated by the main load and sensed by the current transformer was a reverse polarity to the harmonic anti-currents generated by the current transformer. The anti-currents generated by the current transformer were then injected back to the main load to counter act and offset the harmonic distortion currents generated by and coming from the main load on the higher power bus. This global approach generated harmonic anti-currents that mirrored harmonic currents generated by the load on the higher voltage power distribution bus. Thus, this global solution required higher rated components that could hand higher voltages and currents used in the higher voltage power distribution bus.

While this old global approach works for solving global electrical harmonic distortion problems on the higher voltage bus, the global solution can be an expensive over kill for solving a local harmonic distortion voltage problem on a particular local lower power bus. The global solution can also be prohibitively expensive to implement in order to solve a local harmonic voltage problem on a local lower power sub section of the main high power section of the electrical bus. It is considerably cheaper to address the "noisy" voltage problems such as the harmonic distortion problem on the lower power electrical bus where current ratings and voltage ratings are reduced from the higher voltages and current ratings of the higher voltage electrical bus. In some cases where the voltage and power are an order of magnitude higher on the higher voltage bus, a cost savings of an order of magnitude or a factor of ten can be realized by solving the noisy voltage problem on the lower power electrical bus.

In the higher voltage "global" approach, harmonic currents generated by a noisy load on the higher voltage bus are sensed and harmonic anti-currents are generated to clean up the voltage on the main higher power electrical bus, which in turn provides a cleaned up power to a step down transformer that supplies power to the lower power electrical bus.

In "local" solution of a particular illustrative embodiment described herein, lower power components are provided that sense noisy variations in power supplied from the higher voltage to the lower power electrical bus. In contrast to the global approach where harmonic distortion in the power supplied is caused by a load on the higher power bus, in the local system and method described herein, the source of the harmonic distortion is the voltage supplied from the higher power electrical bus caused by the load on the higher power electrical bus.

Thus, in the local solution, the harmonic currents are flowing into the local load in contrast to the harmonic currents flowing from the load on the higher power distribution bus. In addition, in the local solution, the noisy voltage sourced from the higher power bus is sensed and corrected. In a particular illustrative embodiment, the local load is substantially resistive and does not generate significant harmonic currents. Thus, in a particular illustrative embodiment, the voltage supplied from the higher power bus is sensed and corrected. In the local solution the resistive load does not produce substantial harmonic currents so that current transformers placed near the local load are placed in phase with the current flowing to the local load. An active filter senses the local voltage variations and generates currents to correct the voltage variations, thereby cleaning up a lower voltage power supplied to electrical components on the local lower power distribution bus.

In one particular embodiment the higher voltage electrical power is supplied in an ocean going vessel electrical system. Variations in the higher voltage power supplied are cleaned up locally on the lower power bus. After cleaning up the lower power voltage at the local level on the lower power bus, the lower power electrical bus supplies cleaned up power to a submarine tethered to the local lower power electrical bus via a 1500 meter power tether cable. The power is step up from 480 VAC on the lower power electrical bus to 6000 VAC and supplied to the submarine power tether cable. The power is stepped up via an electrical power transformer to reduce losses incurred in providing power to the submarine over a 1500 meter power cable. The stepping up of the power form the lower power electrical bus also steps up voltage variations or power spikes that occur on the local lower power electrical bus. These stepped up power spike can interfere with video and control signals that appear on the submarine tether cable. These stepped up power spike can also harm or burn out electrical device connected to the 6000 VAC power supply tether. Thus, it becomes desirable to clean up the voltage on the lower power bus the local level before supplying power to the submarine tether at 6000 VAC.

In a particular illustrative embodiment, a system and method are provided in which the local harmonic distortion problem on the lower power electrical bus is solved at the local level rather than applying the global approach of the past. Additionally, the local low voltage electrical components are less expensive than global high voltage electrical components. Thus, in a particular illustrative embodiment, the local solution helps to reduce cost, weight and volume of electrical system components on a ship.

In an illustrative embodiment, an active filter, which may consist of, but is not limited to a reactor is provided on a low side of a transformer between the higher power bus and the lower power bus section of an electrical system. The transformer is provided to step down voltage between higher voltage electrical bus and the lower power electrical bus. The reactor includes but is not limited to an inductor. The inductor acts as a filter between the higher voltage electrical bus and the lower power electrical bus. The inductor filter blocks local harmonic anti-currents generated in the lower power sub section of the electrical system on the low side of the step down transformer to solve the local harmonic voltage distortion generated in the lower power subsection of the electrical system. In a preferred embodiment a substantially resistive load is provided on the lower power electrical bus. The filter substantially attenuates the harmonic currents generated in lower power electrical bus so that the currents are not transferred back into the higher power electrical bus.

In an illustrative embodiment, harmonic voltage variations on the voltage supplied to the lower power electrical bus from the higher power electrical bus, are sensed and corrected. Typically the primary voltage on the higher power electrical bus is stepped down via an electrical power transformer positioned between the higher power electrical bus and the lower power electrical bus. In a particular embodiment, a harmonic distortion voltage appears on the voltage signal supplied from the higher power electrical bus to the lower power electrical bus.

In one particular example of an illustrative embodiment, harmonic voltage variations are generated by and are sourced from a load on the main high power electrical bus in the ship borne electrical system. The load on the higher power electrical bus can consist of but is not limited to silicone controlled rectifiers, electrical motors which can generate substantial variations in the voltage level on the higher power electrical bus. In an illustrative embodiment, the local load is not the source of harmonic voltage variations. In one particular illustrative embodiment, harmonic voltage variations on the lower power electrical bus are reduced by sensing the harmonic voltage variations in the voltage supplied from the higher power electrical bus. An active filter generates corrective currents to adjust the local voltage on lower power electrical bus without affecting the higher voltage on the higher voltage electrical bus. In a particular embodiment, a local current transformer is connected in a like polarity to the local lower power subsection of the electrical bus near the local load. The filter (such as a reactor, inductor or other electrical filter) between the main high power electrical bus and the local lower power electrical bus substantially attenuates the local corrective currents generated at the harmonic distortion frequencies so that these local harmonic corrective currents do not feed back into the higher electrical power bus.

In an illustrative embodiment, the local solution saves money by a factor of 10 over the cost of a global solution, based on a comparison of the cost of an active electrical filter for the higher power electrical circuit and the less expensive lower power active filter on the lower power electrical bus. Part of the savings is due to the lower cost of the lower power components compared to higher power components that would be used on the higher power bus of the electrical system.

Turning now to FIG. 1, in a particular illustrative embodiment 100 a sea going vessel 102 such as a ship contains an electrical power supply system 106 that generates and distributes power to electrical components on the ship. The electrical components include but are not limited to lights, motors, and silicone controlled rectifiers. The electrical power supply system also supplies power to a submarine 110 through an electrical cable 108. In a particular illustrative embodiment, the electrical cable is 1500 meters long. A schematic depiction of a particular illustrative embodiment of the electrical power electrical supply system is shown in FIG. 3.

Figure 2:
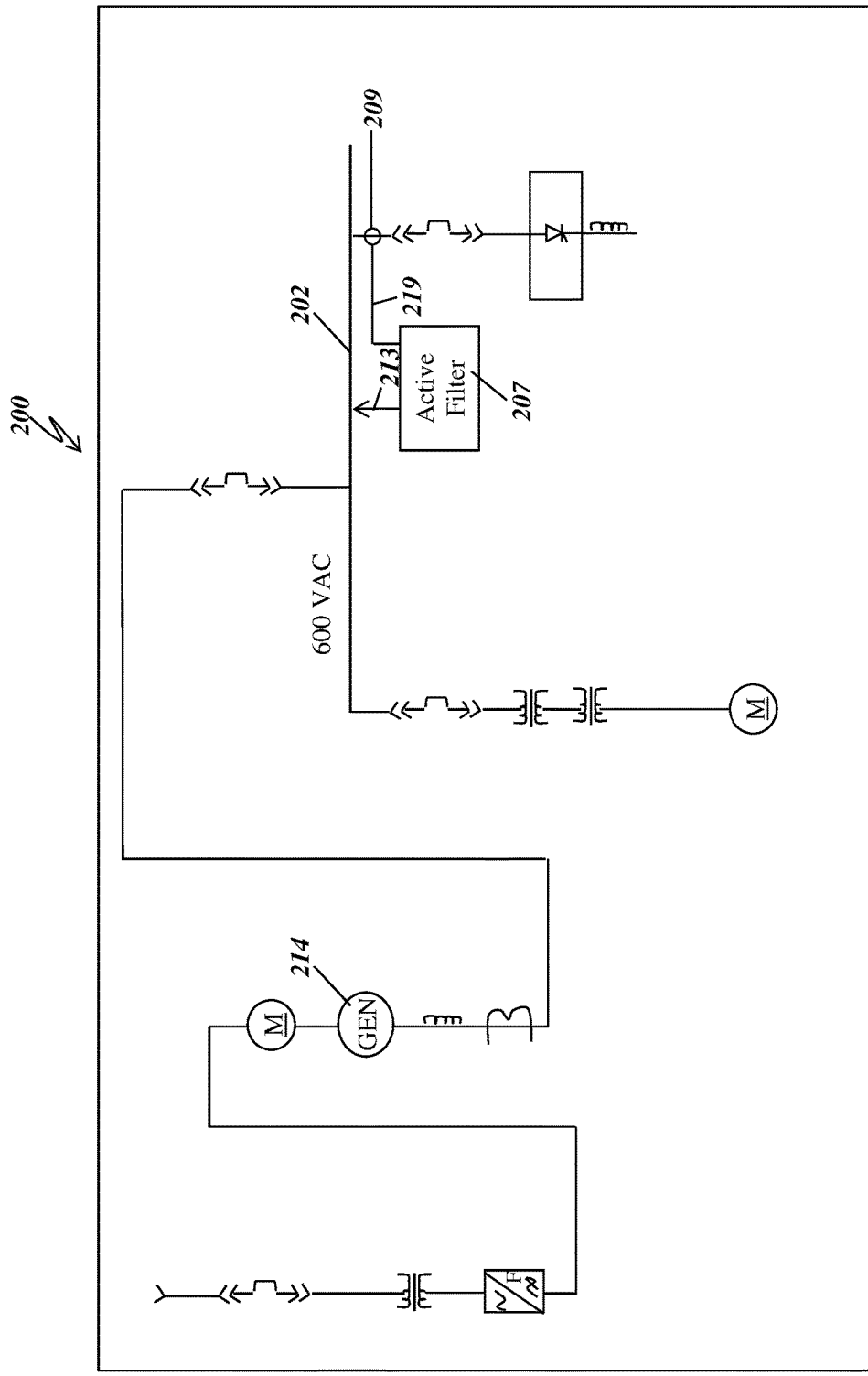
FIG. 2 depicts a schematic representation of an apparatus provided in a global approach to harmonic distortion.

Turning now to FIG. 2, FIG. 2 depicts a schematic representation 200 of a system in accordance with a global solution to harmonic voltage distortion the electrical power electrical supply system on the ship. As shown in FIG. 2, in the global solution power is supplied from electrical generator 214 to a 600 VAC main higher power bus 202. Voltage variations including but not limited to harmonic distortion on the 600 VAC higher power bus 202 are induced by loads such as the silicone controlled rectifier DC drive 201 and reactor load 204. A higher power active filter 207 is applied to generate anti-currents to offset harmonic currents sensed by a current transformer 209 attached to the electrical bus near the loads 204 and 201. The active filter 207 includes but is not limited to a processor in data communication with a computer readable storage medium containing computer instructions that when executed by the processor performs functions. The loads 204 and 201 are symbolic and representative of loads that appear on a higher power electrical bus on a ship but are not all inclusive as the power supply requirements on a ship are diverse. The current transformer 209 is connected in reverse polarity so that harmonic currents generated by the loads 204 and 201 that are sensed and generated by the current transformer are inverted. The inverted harmonic currents sensed by the current transformer are fed to the AC active filter via cable 219. The AC active filter then generates harmonic anti-currents 213 and injects the anti-currents onto the higher power electrical bus 202 which substantially mirrors and cancels out the harmonic currents generated by the loads 204 and 201. The components on the higher power electrical bus including the active filter are rated for a higher power bus to at least 600 VAC.

Figure 3:
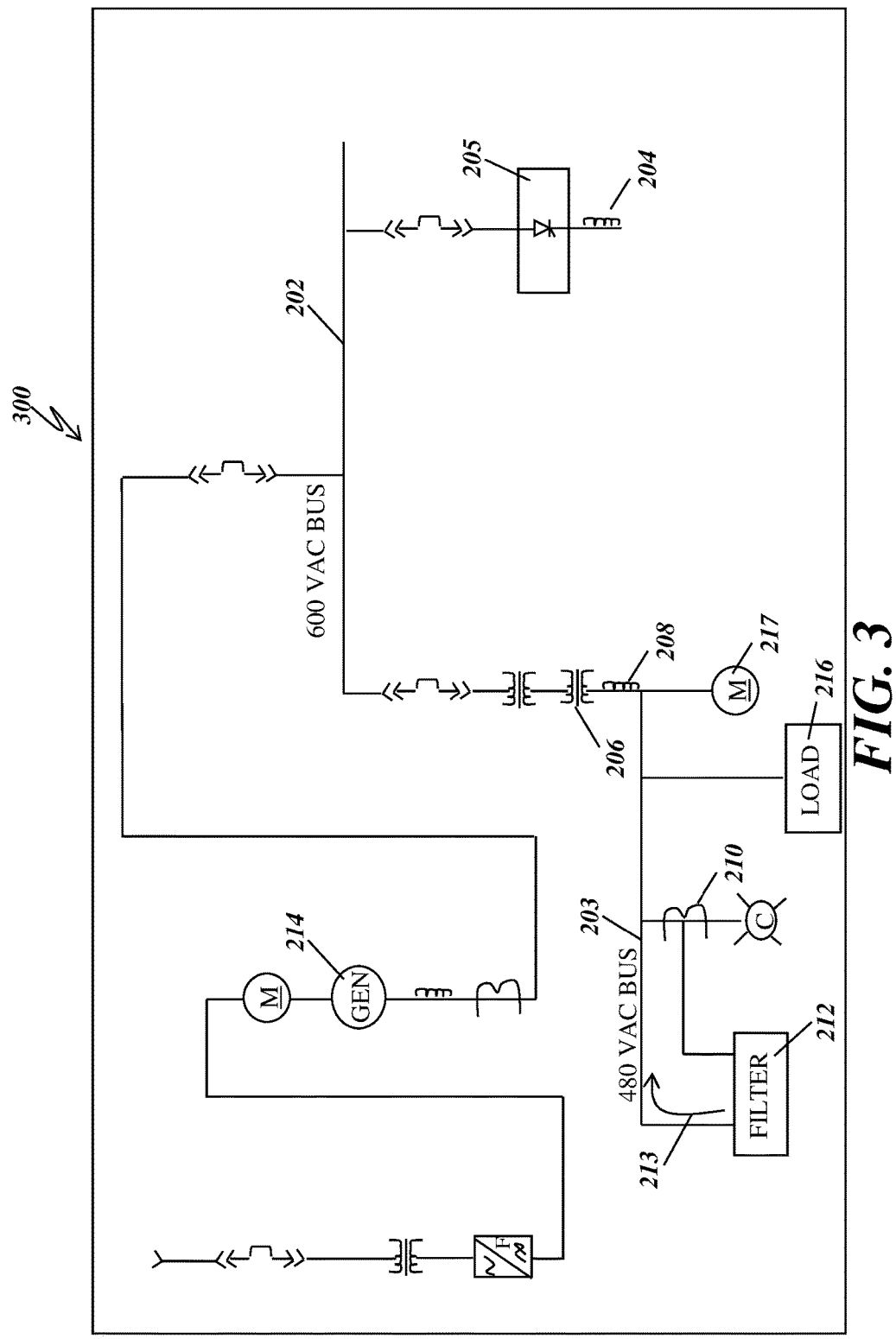
FIG. 3 depicts a schematic representation of an apparatus in accordance with a particular illustrative embodiment.

Turning now to FIG. 3, FIG. 3 depicts a particular illustrative embodiment 300 of the present invention. As shown in FIG. 3, power is supplied from electrical generator 214 to a 600 VAC main higher power bus 202. Voltage variations including but not limited to harmonic distortion on the 600 VAC higher power bus 202 are induced by loads such as the silicone controlled rectifier DC drive 201 and reactor load 204. Power is supplied from the higher voltage bus 202 to transformer 206 which steps down the higher power 600 VAC the lower power 480 VAC supplied to the lower power bus 203. In a particular illustrative embodiment, an active filter 212 is provided on the lower power electrical bus. One suitable active filter is commercially available from ABB n.v. Power Quality Products, Avenue Centrale, 10, Zoning Industriel de Jumet, B-6040 Charleroi (Jumet), Belgium Phone +32 71 250 811. The active filter 212 includes but is not limited to a processor in data communication with a computer readable storage medium containing computer instructions that when executed by the processor performs functions.

In the illustrative embodiment depicted in FIG. 3, current transformers 210 are connected so that the harmonic voltage deviations from a sinusoidal wave form sensed on the lower power bus are corrected or "cleaned up" to appear more as a more sinusoidal waveform. In a particular embodiment, deviations from a sinusoidal voltage wave form in the stepped down voltage on the lower power bus are sensed and corrected by an active filter 212 and current transformers 210 so that the stepped down lower voltage is "cleaned up" and appears more sinusoidal. In an illustrative embodiment, the current transformers 210 are connected near the loads 216 and 217. The current transformers are connected so that currents sensed and generated by the current transformers are not inverted. Harmonic frequency distortion variations in the voltage supplied from the higher power electrical bus 202 are sensed by the current transformers 210. Active filter 212 generates harmonic frequency corrective currents 213 to substantially reduce deviations from a sinusoidal wave form in the voltage on the lower power bus. The active filter injects the harmonic frequency corrective currents into the lower power electrical bus to clean up the voltage on lower power bus 203 to supply a cleaned up substantially sinusoidal voltage wave form on the lower power bus 203. The lower power bus then supplies cleaned up substantially sinusoidal voltage to the load 216 which can be the submarine110 on the end of a 1500 meter cable 108. Filter 208, which can be but is not limited to a reactor or inductor substantially attenuates the harmonic corrective currents generated by the active filter 212. Thus, the corrective currents are substantially attenuated by the filter 208. The filter 208 thus substantially blocks the harmonic corrective currents generated on the lower power bus from transferring back to the higher power bus 202 and power generator 214.

Figure 4:
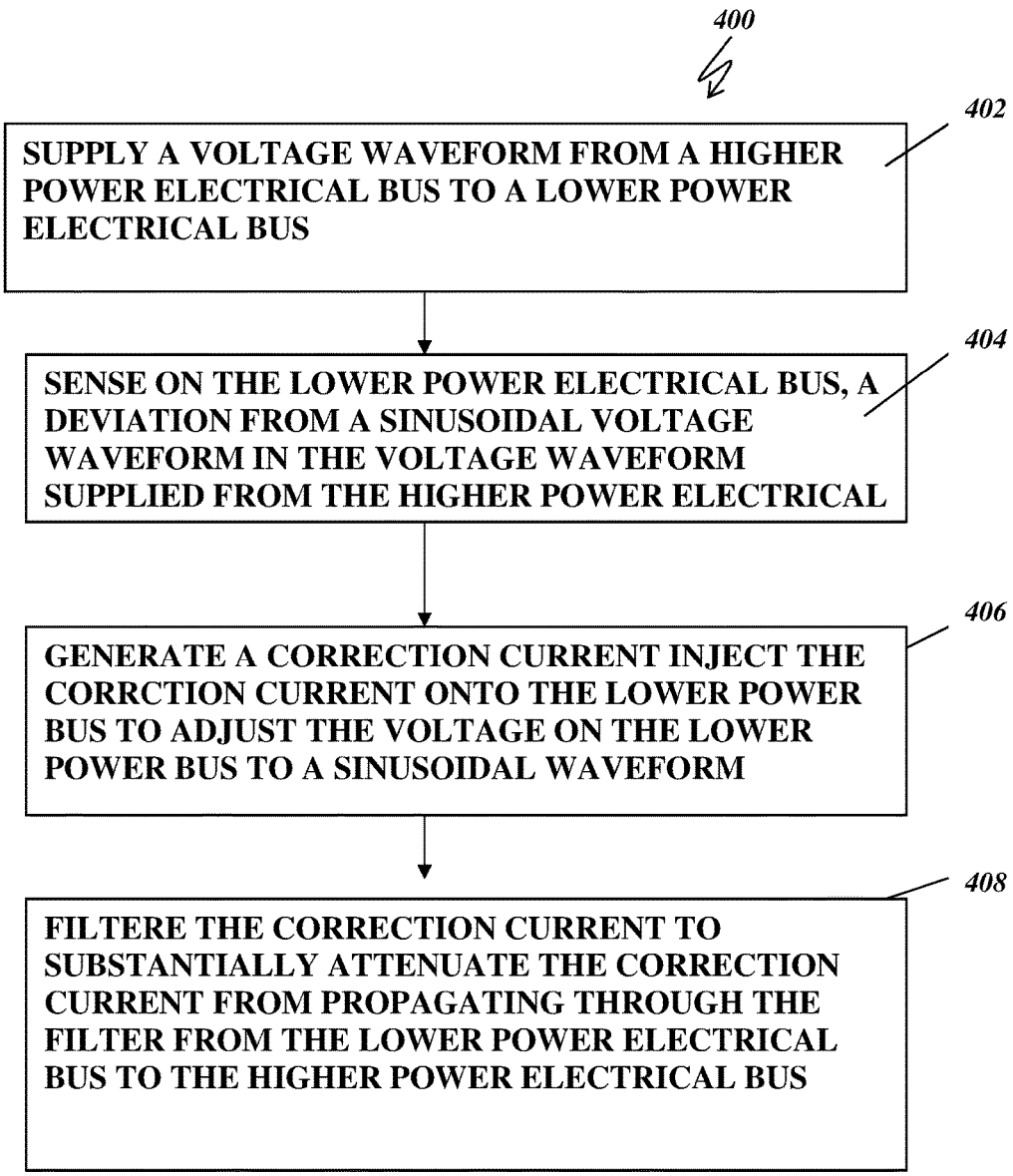
FIG. 4 depicts a flow chart of a particular illustrative embodiment of a method.

Turning now to FIG. 4, FIG. 4 depicts a flow chart of an illustrative embodiment 400 of a method in accordance with the present invention. As shown in FIG. 4, a flow chart for a method is depicted for an illustrative embodiment of the method. As shown in block 402 an initial optional step in the method is supplying a voltage waveform from a higher power electrical bus to a lower power electrical bus. As shown in block 404, the method performs sensing on the lower power electrical bus, a deviation from a sinusoidal voltage waveform in the voltage waveform supplied from the higher power electrical bus. A shown in block 406, the method performs generating a correction current and injecting the correction current onto the lower power bus to adjust the deviation in the voltage on the lower power bus to a substantially sinusoidal voltage waveform. A shown in block 408, the method performs filtering the correction current to substantially attenuate the correction current from propagating through the filter from the lower power electrical bus to the higher power electrical bus.

In another illustrative embodiment, a method is disclosed including but not limited to supplying a voltage waveform from a higher power electrical bus to a lower power electrical bus; sensing on the lower power electrical bus, a deviation from a sinusoidal voltage waveform in the voltage waveform supplied from the higher power electrical bus; generating a correction current to adjust the deviation in the voltage on the lower power bus to a substantially sinusoidal voltage waveform; and filtering the correction current to substantially attenuate the correction current from propagating through the filter from the lower power electrical bus to the higher power electrical bus. In another embodiment of the method the deviation is at a harmonic frequency. In another embodiment of the method the filter substantially attenuates the harmonic frequency. In another embodiment of the method the sensing of the harmonic anti-current is at frequency higher than a fundamental frequency for the voltage supplied from the main high power electrical bus so that the filter attenuates the harmonic frequencies higher than the fundamental frequency.

In another embodiment a system is disclosed including but not limited to a higher power electrical bus; a transformer in electrical communication with the higher power electrical bus; a lower power electrical bus in electrical communication with the transformer; a filter positioned between the transformer and the lower power electrical bus and in electrical communication with the higher power electrical bus and the lower power electrical bus; a current transformer in electrical communication with the lower power electrical; an active filter in electrical communication with the current transformer and the lower power electrical bus for a deviation from a sinusoidal voltage waveform on the lower power electrical bus; an active filter in electrical communication with the current transformer for generating a correction current to adjust the deviation in the voltage on the lower power electrical bus to a substantially sinusoidal voltage waveform on the lower power electrical bus; and a filter positioned between the transformer and the lower power electrical bus for to substantially attenuate the correction current to substantially block the correction current from propagating through the filter from the lower power electrical bus to the higher power electrical bus. In another embodiment of the system, the deviation is at a harmonic frequency for the fundamental frequency of power supplied on the lower power electrical bus. In another embodiment of the system, the filter substantially attenuates the correction current at the harmonic frequency. In another embodiment of the system, the harmonic correction current is at frequency higher than a fundamental frequency for the voltage supplied from the main high power electrical bus so that the filter attenuates the harmonic correction current frequencies higher than the fundamental frequency.

While the non transitory computer readable medium is shown in an example embodiment to be a single medium, the term "computer readable medium" should be taken to include a single medium or multiple media (e.g., a centralized or distributed database, and/or associated caches and servers) that store the one or more sets of instructions. The term "computer readable medium" shall also be taken to include any non-transitory medium that is capable of storing, encoding or carrying a set of instructions for execution by the machine and that cause the machine to perform any one or more of the methodologies of the illustrative embodiment. The term "computer readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the illustrative embodiment is considered to include any one or more of a computer readable medium or a distribution medium, as listed herein and including art-recognized equivalents and successor media, in which the software implementations herein are stored.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived there from, such that structural and logical substitutions and changes may be made without departing from the scope of this disclosure. Figures are merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "illustrative embodiment" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72 (b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

Although the illustrative embodiment has been described with reference to several illustrative embodiments, it is understood that the words that have been used are words of description and illustration, rather than words of limitation. Changes may be made within the purview of the appended claims, as presently stated and as amended, without departing from the scope and spirit of the illustrative embodiment in its aspects. Although the illustrative embodiment has been described with reference to particular means, materials and embodiments, the invention is not intended to be limited to the particulars disclosed; rather, the invention extends to all functionally equivalent structures, methods, and uses such as are within the scope of the appended claims. In accordance with various embodiments of the present illustrative embodiment, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

The invention claimed is:

1. A computer program product comprising:
   a non-transitory computer readable medium containing computer instructions that when executed by a processor perform functions to reduce harmonic distortion, the computer program comprising:
   instructions to supply a higher voltage waveform from a higher power electrical bus to a lower power electrical bus through a transformer to form a lower power voltage;
   instructions to generate an in-phase current from the lower power voltage using a current transformer;
   instructions to sense on the lower power electrical bus , wherein the lower power electrical bus provides power to a substantially resistive load, a deviation from a sinusoidal voltage waveform in the lower power voltage waveform supplied from the higher power electrical bus;
instructions to generate an in-phase correction current in an active filter using the in-phase current from the current transformer;
instructions to supply the in-phase correction current opposing an in-phase current on the lower power electrical bus to adjust the deviation in the voltage on the lower power bus to a substantially sinusoidal voltage waveform thereby proving a cleaned-up lower power voltage on the lower power electrical bus;
instructions to step up the cleaned-up lower power voltage to a highest voltage using a transformer;
instructions to supply the highest voltage to a load; and
instructions to filter the correction current to substantially attenuate the correction current from propagating through the filter from the lower power electrical bus to the higher power electrical bus.

2. The product of claim 1, wherein the deviation is at a harmonic frequency.

3. The product of claim 2, wherein the filter substantially attenuates the harmonic frequency.

4. The product of claim 3, wherein the harmonic anti-current is at frequency higher than a fundamental frequency for the voltage supplied from the main high power electrical bus so that the filter attenuates the harmonic frequencies higher than the fundamental frequency.

5. A system comprising:
a processor;
a non-transitory computer readable medium in data communication with the processor, the computer program comprising instructions to supply a higher voltage waveform from a higher power electrical bus to a lower power electrical bus through a transformer to form a lower power voltage;
instructions to generate an in-phase current from the lower power voltage using a current transformer;
instructions to sense on the lower power electrical bus, wherein the lower power electrical bus provides power to a substantially resistive load, a deviation from a sinusoidal voltage waveform in the lower power voltage waveform supplied from the higher power electrical bus;
instructions to generate an in-phase correction current in an active filter using the in-phase current from the current transformer;
instructions to supply the in-phase correction current opposing an in-phase current on the lower power electrical bus to adjust the deviation in the voltage on the lower power bus to a substantially sinusoidal voltage waveform thereby proving a cleaned-up lower power voltage on the lower power electrical bus;
instructions to step up the cleaned-up lower power voltage to a highest voltage using a transformer;
instructions to supply the highest voltage to a load; and
instructions to filter the correction current to substantially attenuate the correction current from propagating through the filter from the lower power electrical bus to the higher power electrical bus.

6. The system of claim 5, wherein the deviation is at a harmonic frequency for the fundamental frequency of power supplied on the lower power electrical bus.

7. The system of claim 6, wherein the filter substantially attenuates the correction current at the harmonic frequency.

8. The system of claim 7, wherein the harmonic correction current is at frequency higher than a fundamental frequency for the voltage supplied from the main high power electrical bus so that the filter attenuates the harmonic correction current frequencies higher than the fundamental frequency.

* * * * *